Figure 1:
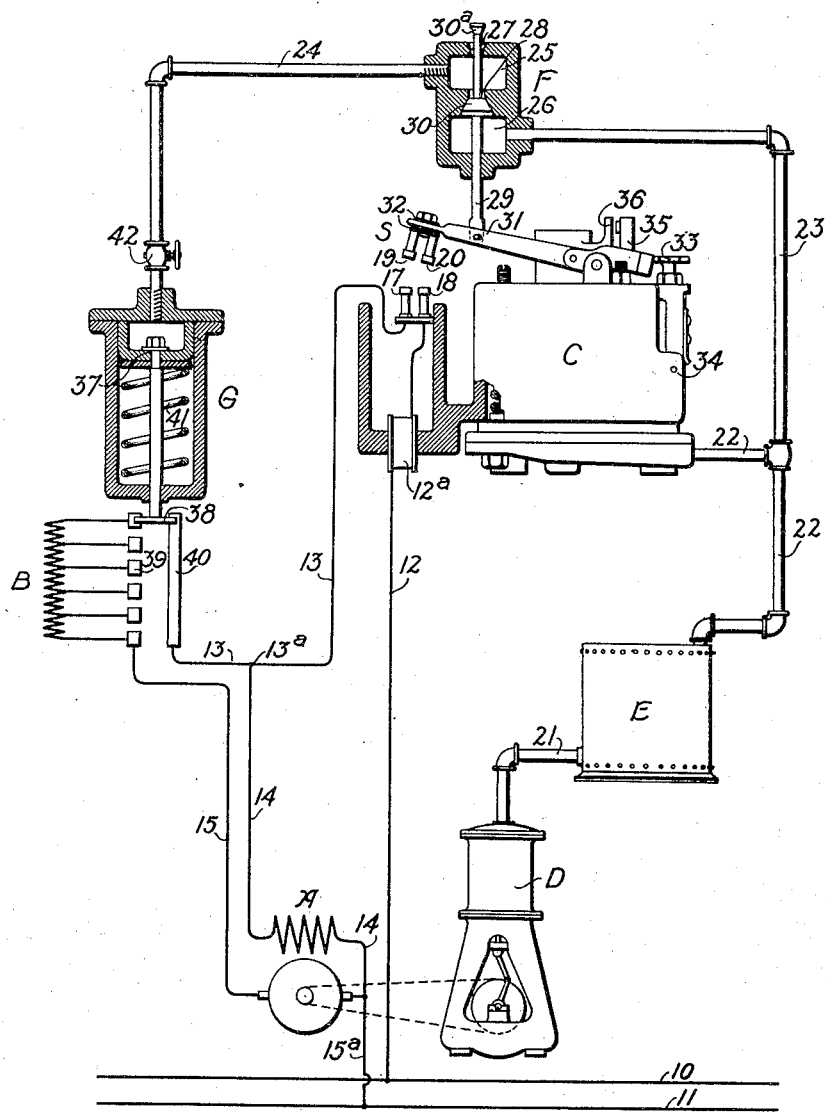

No. 829,845. PATENTED AUG. 28, 1906.
F. B. COREY.
FLUID PRESSURE SYSTEM.
APPLICATION FILED FEB. 2, 1903.

2 SHEETS—SHEET 1.

Witnesses:
Harry M. Tilden
Helen Orford

Inventor:
Fred B. Corey.
by Albert G. Davis
Att'y.

No. 829,845. PATENTED AUG. 28, 1906.
F. B. COREY.
FLUID PRESSURE SYSTEM.
APPLICATION FILED FEB. 2, 1903.

2 SHEETS—SHEET 2.

Witnesses:
Irving E. Steers.
Helen Alford

Inventor:
Fred B. Corey.
by Albert G. Davis
Atty.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

FLUID-PRESSURE SYSTEM.

No. 829,845. Specification of Letters Patent. Patented Aug. 28, 1906.

Application filed February 2, 1903. Serial No. 141,551.

*To all whom it may concern:*

Be it known that I, FRED B. COREY, a citizen of the United States, residing at Schenectady, in the county of Schenectady, State of New York, have invented certain new and useful Improvements in Fluid-Pressure Systems, of which the following is a specification.

The purpose of the invention disclosed in the present application is to improve generally existing fluid-pressure systems, such as air-brake systems, in which the fluid is compressed by a compressor actuated by a shunt-wound electric motor and is maintained in a stored-up condition at practically constant pressure by automatic means whereby when the pressure falls below a predetermined point the motor is automatically thrown into circuit to operate the compressor, and when a predetermined pressure is reached the motor is automatically cut out and the compressor stopped.

One object of my invention is to construct the controlling mechanism of the motor-starting rheostat, so that when there is no pressure on the system all the resistance of said rheostat will be in series with the armature. This feature is of considerable importance as a protective device, since the armature cannot be burned out by an unexpected closing of the circuit, such as might occur upon placing the trolley-wheel upon the trolley-wire, where the system is installed on an electric car.

Another object of my invention is to provide for use in a system of the kind specified a governor having not only a switch for controlling the motor-circuit, but also a valve for controlling the supply of compressed air or other fluid to the rheostat-operating mechanism.

Another object is to provide, in combination with other parts, a governor-switch having a snap-action, and one which is not dependent for its operation upon the action of the rheostat-operating mechanism.

Another object is to provide a governor-valve for admitting air or other fluid to the rheostat-operating mechanism, which shall have a quick strong action similar to the snap action of the switch, whereby the rheostat-arm is not moved back and forth over its contacts upon every variation of pressure in the system, however slight, but is moved either in one direction or the other throughout its whole range of motion or a considerable extent thereof and then only upon a substantial variation of pressure, dependent upon the adjustment of the governor.

Other objects and advantages of my invention will appear from the more detailed description hereinafter given, and the novel features and combinations therein described will be specifically and distinctly set forth in the appended claims.

Figure 2:
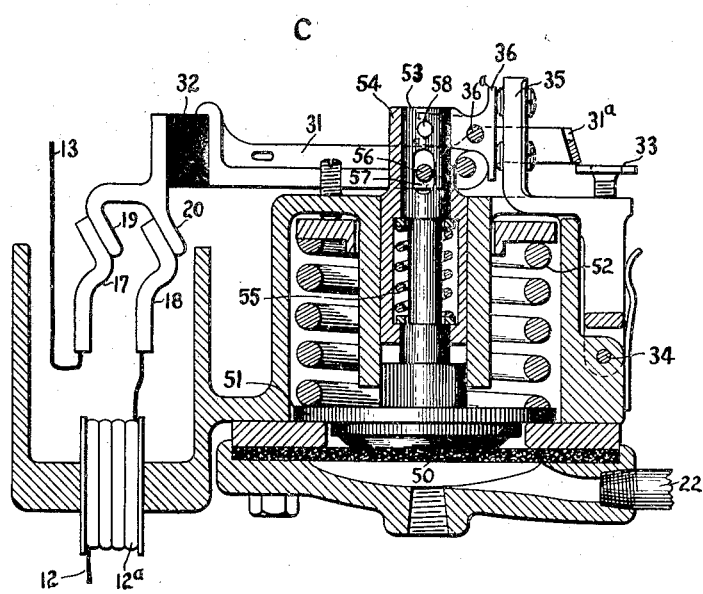

In the accompanying drawings, Figure 1 indicates a complete system arranged in accordance with the present invention, and Fig. 2 illustrates in cross-section one form of pneumatic governor which may be used in said system.

The electrical part of the system includes a shunt-wound motor A, geared to an air-compressor D and electrically connected with the supply-wires 10 and 11. The conductor $15^a$ connects one brush of the armature with the supply-wire 11, and the conductor 15 connects the other brush with one of the terminals of the rheostat B, which has its other terminal connected through the wire 13 with the contact 17 of the switch S of the governor C. The field of the motor is connected in shunt between the wires 13 and $15^a$ by the wire 14, as indicated. The supply-wire 10 is connected through the conductor 12 with the contact 18 of the switch S. The conductor 12 includes a blow-out coil $12^a$, which is used in a well-known manner to blow out any arc which may be formed at the contacts of the switch.

The compressor D, which is driven when the motor is in circuit, supplies air under pressure for the system. This compressor is connected by the pipe 21 with reservoir E, which in turn is connected through the pipes 22 and 23 with the governor C and the valve F. The valve F is provided with two chambers 25 and 26, which are connected by the opening 28. The pipe 23, running from the reservoir E, enters the lower chamber 26, and the upper chamber 25 communicates with the atmosphere through the opening 27 and with the cylinder G through the pipe 24. Each of these openings 27 and 28 is provided with a valve-seat. Upon the stem 29 are valve-cones 30 and $30^a$, which engage the seats in the openings 27 and 28, respectively. The lower end of the stem 29 is connected to the contact-controlling lever 31 of the switch S. Contacts 19 and 20 are secured to the outer end of this lever 31 and insulated therefrom by suitable insulation 32.

The governor C, which in itself forms no part of the present invention, has substantially the same construction as the governor for which Patent No. 671,244 was granted on April 2, 1901, on an application filed by S. B. Stewart, Jr. This governor consists of a diaphragm 50, subjected on one side to the pressure of the fluid in pipe 22 and carrying on its other side a piston 51. The piston and diaphragm are normally pressed downward through the action of a spring 52. A stem 53, secured to the piston, projects outwardly beyond the casing of the governor and is surrounded by a sliding sleeve 54. A spring 55, arranged between shoulders within the sleeve 54 and upon the stem 53, tends normally to hold these members in the relative positions shown in Fig. 2. The sleeve 54 is pivotally connected to the switch-arm 31 through a pin 56, which may pass completely through the sleeve and play in a slot 57 in the stem. A pin 58 in the upper end of the stem engages a trip 36, which is pivotally supported upon the sleeve 54 at 36$^a$ and is adapted to operate a catch 33 to unlock the switch-arm 31. The catch 33 is pivoted at 34 to the casing and has an arm 35 extending into proximity to the trip 36. The switch-arm may be locked either in its open or its closed position by reason of the catch engaging with the under or the upper side of the member 31$^a$, projecting from the rear end of the switch-arm. Assuming the switch to be closed and the pressure beneath the diaphragm to be increasing, it will be noted that the springs 52 and 55 are compressed through the movement of the piston and its stem, while the sleeve 54 remains locked in the position shown by reason of the pin 56. As the piston rises the trip 36 is oscillated on its pivot, gradually forcing the arm 35 of the catch backward. As soon as the catch has been moved sufficiently to release the member 31$^a$ the spring 55 comes into play to throw the switch-arm outward with a quick movement. The catch is released and snaps back, locking the switch open. Similarly upon a subsequent decrease in the pressure beneath the diaphragm energy will be stored in the spring 55 through the reverse movement of the piston and stem until the switch-arm is unlocked and the spring 55 is enabled to snap the switch-arm to its circuit-closing position.

The cylinder G, with its piston 37, constitutes the rheostat-operating means. The piston is rigidly connected with the contact-arm 38 of the rheostat and moves said arm over the contacts 39 and 40, gradually cutting out resistance from the armature-circuit in its outward movement and restoring said resistance upon its return movement. Normally the arm 38 is in its uppermost position and at that time all the resistance of the rheostat is in series with the motor-armature. A spring 41, inclosed within the cylinder, returns the piston 37 and the contact-arm 38 to normal position. The pipe 24 is provided with a valve 42 to regulate the flow of compressed air to the cylinder G, and thereby the speed of the piston 37.

In the operation of the system, assuming that the fluid-pressure has dropped below the pressure for which the governor was set, the governor will actuate the switch-lever 31 to close the switch S by a firm positive action, thereby closing the motor-circuit. Current will then pass from the supply-wire 10 through the conductor 12, including the blow-out magnet 12$^a$, to the switch S, thence through the contacts 18, 20, 19, and 17 of said switch, through the conductor 13 to the point 13$^a$, where it divides, part passing through the wire 14 and the field of the motor and part by way of the conductor 13, contact-strip 40, arm 38, one of the contacts 39, conductor 15, and the motor-armature to the conductor 15$^a$, through which the circuit is completed, to the supply-wire 11. The action of the governor in closing the switch S will start the motor with all the resistance of the rheostat in circuit therewith. At the same time that the lever 31 is actuated the stem 29 of the valve F will be drawn down, thereby closing the opening to atmosphere and opening a passage between the chambers 25 and 26, so that compressed air will pass from the chamber 26 through the opening 28 into the chamber 25 and thence by the pipe 24 to the cylinder G. This increased pressure in the cylinder will force the piston 37 outward against the pressure of the spring 41, and thereby gradually cut out the resistance of the rheostat B. The motor being thus started will actuate the compressor D to raise the pressure of the system up to the desired point. When this point is reached, the governor C will open the switch S, and consequently the motor-circuit, and at the same time will actuate the valve-stem to exhaust the cylinder G to atmosphere through the pipe 24, chamber 25, and opening 27 and to cut off the compressed-air supply by closing the opening 28. The pressure being removed from the cylinder G, the spring 41 will return the piston 37 and the rheostat-arm 38 to normal position.

From the above it will be seen that if my improved system is applied to an electric car and the car is allowed to stand idle, so that the pressure in the system falls to that of the atmosphere and then current is suddenly sent through the circuit, which might occur by placing the trolley upon the trolley-wire, there will be no danger of burning out the motor, because the resistance of the rheostat under such circumstances is always cut in. It should also be noted that the resistance of the rheostat is not located in series with the field, but is in parallel therewith and that the switch on the governor C is not dependent in its action upon the operation of the piston 37, and even though the piston should fail to operate the motor would still be started.

Although I have shown my invention embodied in a specific system, I do not wish to be limited to such system, as the principles of my invention may be applied to various forms, and many modifications and alterations may be made without departing from the spirit of it.

What I claim as new, and desire to secure by Letters Patent of the United States, is—

1. In a fluid-pressure system, the combination of an electric motor, a switch in the motor-circuit, a fluid-operated rheostat for starting said motor, means for controlling the passage of fluid to and from said rheostat, and automatic means for mechanically operating said switch and said fluid-controlling means in response to variations of pressure in the system.

2. In a fluid-pressure system, the combination of an electric motor, a switch in the motor-circuit, a fluid-operated rheostat for starting said motor, means for controlling the passage of fluid to and from said rheostat, and pneumatically-actuated means for simultaneously operating said switch and said fluid-controlling means in response to variations of pressure in the system.

3. In a fluid-pressure system, the combination of a shunt-wound motor, a supply-circuit therefor, a rheostat for starting said motor, a piston for operating said rheostat, a valve for admitting fluid to operate said piston, and a fluid-pressure governor operating directly to open and close said valve and provided with contacts to make and break the motor-supply circuit.

4. In a fluid-pressure system, the combination of an electric circuit, a switch and a rheostat in said circuit, pneumatic controlling means for said rheostat, a duct leading to said controlling means, means for controlling said duct, and automatic means for mechanically operating said switch and said duct-controlling means in response to variations of pressure in the system.

5. In a fluid-pressure system, the combination of an electric circuit, a switch and a rheostat in said circuit, pneumatic controlling means for said rheostat, a valve associated with said pneumatic controlling means and mechanically connected to said switch, and pneumatically-actuated means for operating said switch in response to variations of fluid-pressure in the system.

6. In a fluid-pressure system, the combination of an electric circuit, a switch and a controlling device in said circuit, pneumatic actuating means for said controlling device, a valve for governing said controlling device, and means for mechanically operating said switch and said valve in response to variations of pressure in the system.

7. In a fluid-pressure system, a fluid-pressure governor adapted to be actuated by variations of pressure in said system, comprising contacts, a contact-controlling lever and pneumatically-actuated means for operating said lever, a valve-body with two communicating chambers provided with inlet and outlet pipe connections and an exhaust-opening, and a valve-stem secured to the contact-controlling lever of the governor and provided with means for opening and closing the exhaust-opening and the passage between the chambers.

In witness whereof I have hereunto set my hand this 30th day of January, 1903.

FRED B. COREY.

Witnesses:
BENJAMIN B. HULL,
HELEN ORFORD.